(12) United States Patent
Kim et al.

(10) Patent No.: US 8,810,373 B2
(45) Date of Patent: Aug. 19, 2014

(54) ACTIVE ENERGY HARVESTING FOR RADIO-FREQUENCY IDENTIFICATION DEVICES

(76) Inventors: Moon J. Kim, Wappingers Falls, NY (US); Bonwoong Koo, Los Altos, CA (US)

(*) Notice: Subject to any disclaimer, the term of this patent is extended or adjusted under 35 U.S.C. 154(b) by 575 days.

(21) Appl. No.: 12/950,188

(22) Filed: Nov. 19, 2010

(65) Prior Publication Data

US 2012/0126955 A1     May 24, 2012

(51) Int. Cl.
*H04Q 5/22*     (2006.01)

(52) U.S. Cl.
USPC ............... 340/10.34; 340/13.23; 340/13.24; 340/13.26

(58) Field of Classification Search
CPC ............ G06K 7/0008; G06K 19/0723; G06K 19/07749; G06K 19/0724; G06K 19/0707; G06K 19/0712; G06K 19/0701; G06K 9/00111; H04L 67/12; H04L 67/04; H01Q 1/2216; H04B 5/0062; H04B 17/0062; H04M 2207/18; H04M 2242/14; H04M 3/436; H04M 3/53; B61L 25/043; G08C 19/12; G08C 17/02; G08C 19/14; A63H 30/04; E05F 15/2076; G01R 23/005; G01R 23/06; H04W 88/027; H04W 4/02; H04W 4/001; H04W 4/021; H04W 4/027; H04W 88/06; G05D 1/0011; G07C 2009/00793; A63J 17/00; B67D 7/348; G06F 1/1626
USPC ...................... 340/10.34, 13.23, 13.24, 13.26
See application file for complete search history.

(56) References Cited

U.S. PATENT DOCUMENTS

| | | | |
|---|---|---|---|
| 7,374,105 B2 | 5/2008 | Zhu et al. | |
| 7,443,299 B2 | 10/2008 | Forster | |
| 7,515,049 B2 | 4/2009 | Sharma et al. | |
| 7,659,821 B2 | 2/2010 | Kim et al. | |
| 7,786,868 B2 | 8/2010 | Forster | |
| 2006/0202032 A1 | 9/2006 | Kricorissian | |
| 2007/0194936 A1* | 8/2007 | Hoshina | 340/572.8 |
| 2007/0285244 A1 | 12/2007 | Tucker et al. | |
| 2008/0180249 A1* | 7/2008 | Butler et al. | 340/572.1 |
| 2009/0058635 A1* | 3/2009 | LaLonde et al. | 340/539.11 |
| 2009/0085750 A1 | 4/2009 | Waldner et al. | |
| 2009/0289773 A1 | 11/2009 | Hoyt et al. | |
| 2010/0060290 A1* | 3/2010 | Sanderson et al. | 324/536 |
| 2010/0201488 A1 | 8/2010 | Stern et al. | |
| 2011/0133890 A1* | 6/2011 | Duron et al. | 340/10.1 |

* cited by examiner

*Primary Examiner* — Omer S Khan
(74) *Attorney, Agent, or Firm* — Hunter E. Webb; Keohane & D'Alessandro, PLLC

(57) ABSTRACT

In general, embodiments of the present invention provide approaches for providing power to RFID transponders. In one embodiment, the RFID transponder is powered using a magnetic field generated by power lines. In another embodiment, the RFID transponder is powered using a field generated by a wireless network. In the case of the latter, the RFID transponder acts as a member of the wireless network. In so doing, the RFID transponder is granted user rights and controls, and can control devices that are available on the network.

12 Claims, 5 Drawing Sheets

ACTIVE ENERGY HARVESTING FOR RADIO-FREQUENCY IDENTIFICATION DEVICES

FIELD OF THE INVENTION

The present invention generally relates to radio-frequency identification (RFID) technology. Specifically, the present invention relates to active energy harvesting for RFID devices.

BACKGROUND OF THE INVENTION

Over recent years, RFID has become an increasing function of providing wireless communications. For example, RFID is commonly implemented in security devices (e.g., swipers and/or card readers) for businesses as well as in many other areas. Unfortunately, RFID is typically passive and has its range limited by distance and physical obstacles. Moreover, RFID reader power is limited by regulation, which causes range issues since RFID operational range is constrained by the available power. As such, RFID reliability and responsiveness are commonly compromised in practical environments. In view of the foregoing, there exists a need to extend RFID range within the given power limit while still remaining as a passive RFID. The related art has failed to provide such functionality, including those references listed below:

U.S. Pat. No. 7,786,868 discloses an RFID device with multiple passive operation modes that are fully passive or boosted passive. The boosted passive mode utilizes an internal energy booster. The energy booster may include a one-port transistor and an energy source that is used to power the transistor.

U.S. Pat. No. 7,443,299 discloses an extended range RFID system for discs such as CDs, DVDs, or minidiscs. A special RFID transponder and antenna configuration is used and antenna elements are coupled to the transponder extending in opposite directions across an outer annular zone. The monopole or dipole mode of antenna operation (utilizing a metalized disc layer) results from this antenna configuration and is stated as "to more than double the range of the system".

U.S. Pat. No. 7,374,105 discloses an RFID tag having an RFID integrated circuit and an antenna that are combined with a first passive antenna circuit to provide an extended operating range. The second passive antenna circuit is essentially identical to the first antenna, only it has larger dimensions, and is positioned with the coil of the second passive antenna circuit surrounding the first coil to extend the operating range.

U.S. Patent Application 20090289773 discloses a method for extending the read range of passive RFID tags. Excess excitation energy is dissipated through circuitry for a constant current power supply that is implemented either with discrete components integrated into the ASIC design, a network that minimizes the amount of energy that is converted to heat by a traditional configuration's shunt regulator, and/or a sleep mode for reducing the energy consumed by an RFID tag after it has been read.

U.S. Patent Application 20090085750 discloses an extended RFID tag. The extended range RFID tag includes a UHF RFID tag having a dipole antenna attached to a surface of a substrate and further includes an antenna extension that overlaps a portion of the dipole antenna for electromagnetically coupling the antenna extension and the dipole antenna when in operation.

U.S. Patent Application 20070285244 discloses a long range RFID transponder. The improved range is achieved through the RFID power generation's Passive Magnetostrictive Electroactive device component. One example includes a passive magnetic field sensor made of layers of Terfenol-D magnetostrictive material and ceramic PXT-5 to act as a generator to power the RFID when in range of the querying transceiver magnetic field.

U.S. Pat. No. 7,659,821 discloses a smart RFID infrastructure and method that enables communication between RFID tags. Information tables from individual RFID tags are aggregated into master information tables on writeable RFID tags.

U.S. Pat. No. 7,515,049 discloses an extended read range RFID system. This system utilizes an apparatus to extend the reader's antenna signal to a location proximate to the RFID tag. In another embodiment, the apparatus utilizes at least one magnetic rod to create a magnetic path for the RF field to travel between the reader's antenna and the RFID tag.

U.S. Patent Application 20100201488 discloses a system for displaying read range of an RFID reader based upon feedback from fixed RFID beacon tags. An interrogation signal is transmitted from the RFID reader to these fixed RFID beacon tags at known locations.

U.S. Patent Application 20060202032 discloses an automatic identification and data capture system.

SUMMARY OF THE INVENTION

In general, embodiments of the present invention provide approaches for providing power to RFID transponders. In one embodiment, the RFID transponder is powered using a magnetic field generated by power lines. In another embodiment, the RFID transponder is powered using a magnetic field generated by a wireless network. In the case of the latter, the RFID transponder acts as a member of the wireless network. In so doing, the RFID transponder is granted user rights and controls and can control devices that are available on the network.

A first aspect of the present invention provides a method for providing power to radio-frequency identification (RFID) devices through power lines, comprising: placing an RFID transponder within a field generated by a power line; and powering the RFID transponder using the field generated by the power line.

A second aspect of the present invention provides a method for providing power to radio-frequency identification (RFID) devices using a wireless network, comprising: positioning an RFID transponder in range of the wireless network; the RFID transponder acting as a member of the wireless network; and the RFID transponder drawing power from a field generated by the wireless network.

A third aspect of the present invention provides a method for active energy harvesting for radio-frequency identification (RFID) devices, comprising: positioning an RFID transponder in a field generated by a non-RFID power source; and providing power to the RFID transponder using the non-RFID power source.

BRIEF DESCRIPTION OF THE DRAWINGS

These and other features of this invention will be more readily understood from the following detailed description of the various aspects of the invention taken in conjunction with the accompanying drawings in which.

Figure 1:
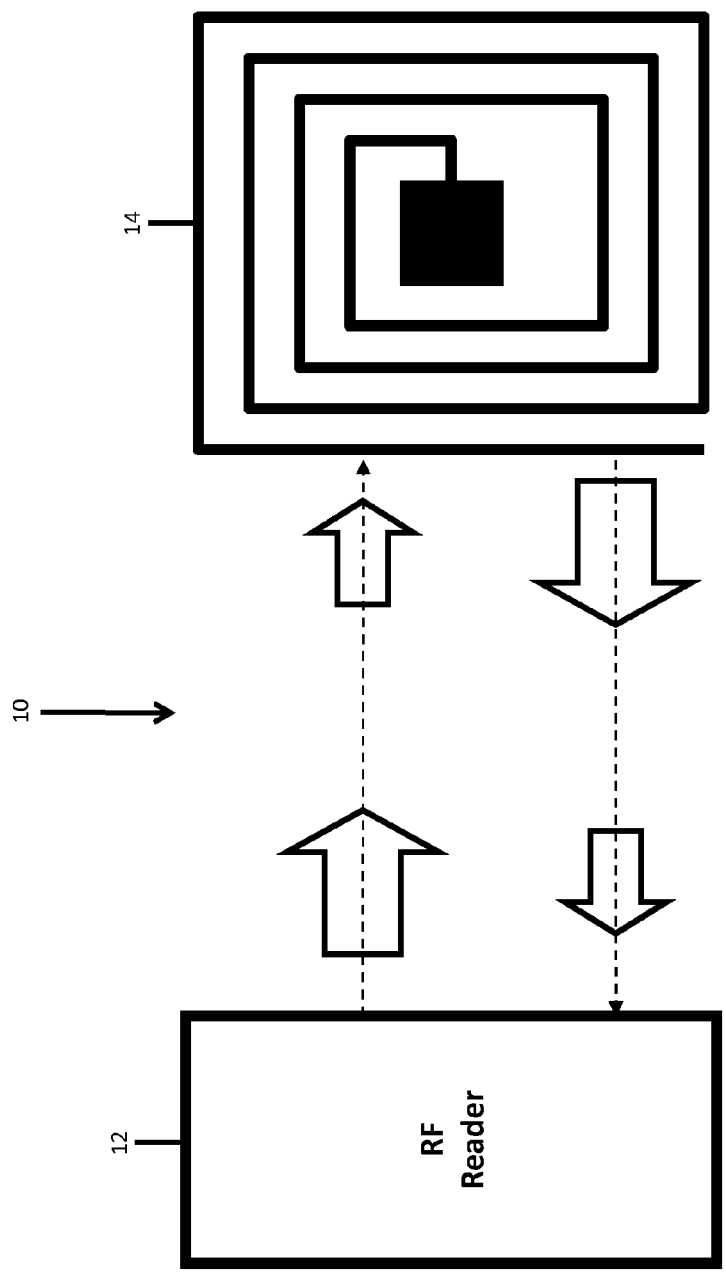
FIG. 1 depicts an RFID configuration according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide approaches for providing power to RFID transponders. In one embodiment, the RFID transponder is powered using a magnetic field generated by power lines. In another embodiment, the RFID transponder is powered using a wireless network. In the case of the latter, the RFID transponder acts as a member of the wireless network. In so doing, the RFID transponder is granted user rights and controls, and can control devices that are available on the network.

In general, RFID is a technology that incorporates the use of electromagnetic or electrostatic coupling in the radio frequency (RF) portion of the electromagnetic spectrum to uniquely identify an object, animal, or person. RFID is coming into increasing use in the industry as an alternative to the bar code. The advantage of RFID is that it does not require direct contact or line-of-sight scanning. An RFID system consists of three components: an antenna and transceiver (often combined into one reader) and a transponder (the tag). The antenna uses radio frequency waves to transmit a signal that activates the transponder. When activated, the tag transmits data back to the antenna. The data is used to notify a programmable logic controller that an action should occur. The action could be as simple as raising an access gate or as complicated as interfacing with a database to carry out a monetary transaction. Low-frequency RFID systems (e.g., 30 KHz to 500 KHz) have short transmission ranges (generally less than six feet). High-frequency RFID systems (850 MHz to 950 MHz and 2.4 GHz to 2.5 GHz) offer longer transmission ranges (more than 90 feet). RFID is sometimes called dedicated short range communication (DSRC).

RFID tags and labels (collectively referred to herein as "devices" or transponders) are widely used to associate an object with an identification code or other information. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels. As noted above, RFID devices are generally categorized as labels or tags. RFID labels are RFID devices that are adhesive or otherwise have a surface attached directly to objects. RFID tags, in contrast, are secured to objects by other means (for example, by use of a plastic fastener, string, or other fastening means).

RFID devices include: (1) active tags and labels, which include a power source for broadcasting signals; and (2) passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and communicate enough information to uniquely identify individuals, packages, inventory, and the like. RFID tags and labels also can be characterized as those to which information is written only once (although the information may be read repeatedly), and those to which information may be written to repeatedly during use. For example, RFID tags may store environmental data (that may be detected by an associated sensor), logistical histories, state data, etc.

Along these lines, RFID devices can be further characterized as passive, semi-passive, and active RFID devices. Passive RFID devices have no internal power supply. Power for operation of passive RFID devices is provided by the energy in an incoming radio frequency signal received by the device. Most passive RFID devices signal by backscattering the carrier wave from an RF reader. Passive RFID devices have the advantage of simplicity and long life, although performance of them may be limited. In general, the teachings recited herein pertain to passive RFID technology Referring now to FIG. 1, an illustrative RFID configuration according to the present invention is shown. As depicted, configuration 10 shows an RFID transceiver/reader 12 communicating with RFID transponder 14. Transponder 14 can be any type of RFID transponder now known or later developed. Examples include the aforementioned labels and/or tags. As further shown, RFID reader 12 and RFID transponder 14 will exchange data (e.g., security information, etc.). Under the present invention, these types of components will be leveraged to create a strong passive ad-hoc RFID network that is (among other things) capable of communicating over longer distances and around physical objects.

Figure 2:
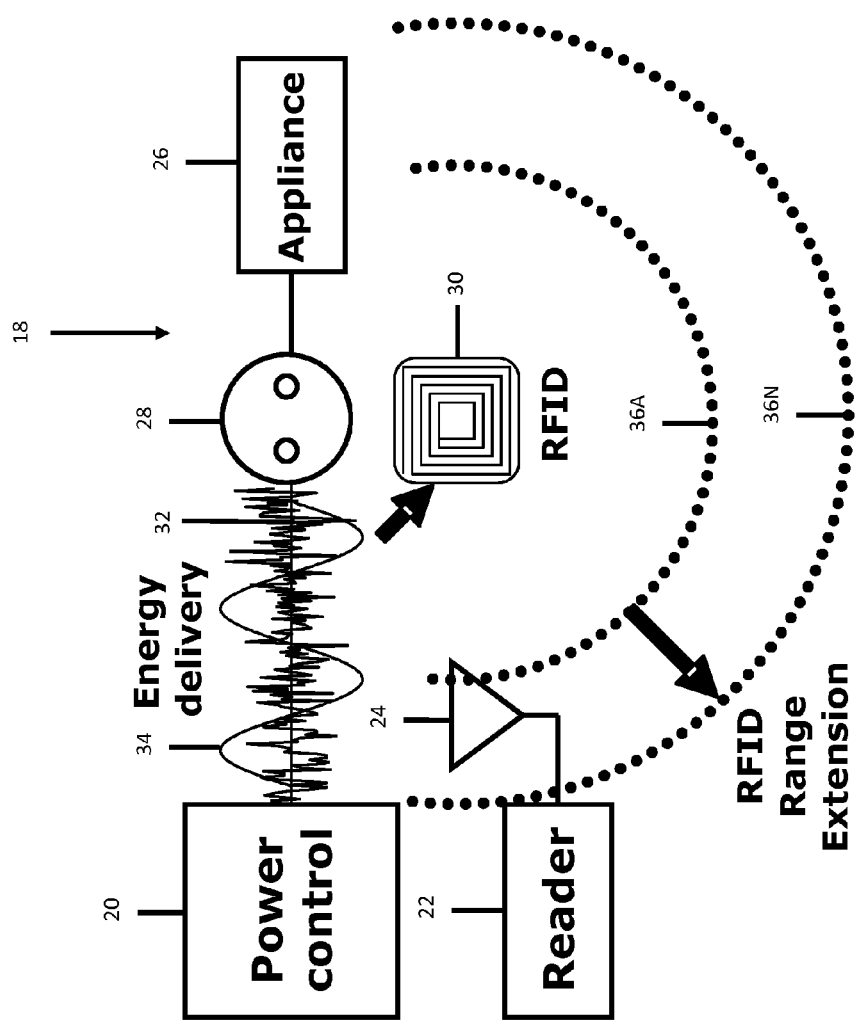
FIG. 2 depicts power delivery to RFID devices using power lines according to an embodiment of the present invention.
Figure 3:
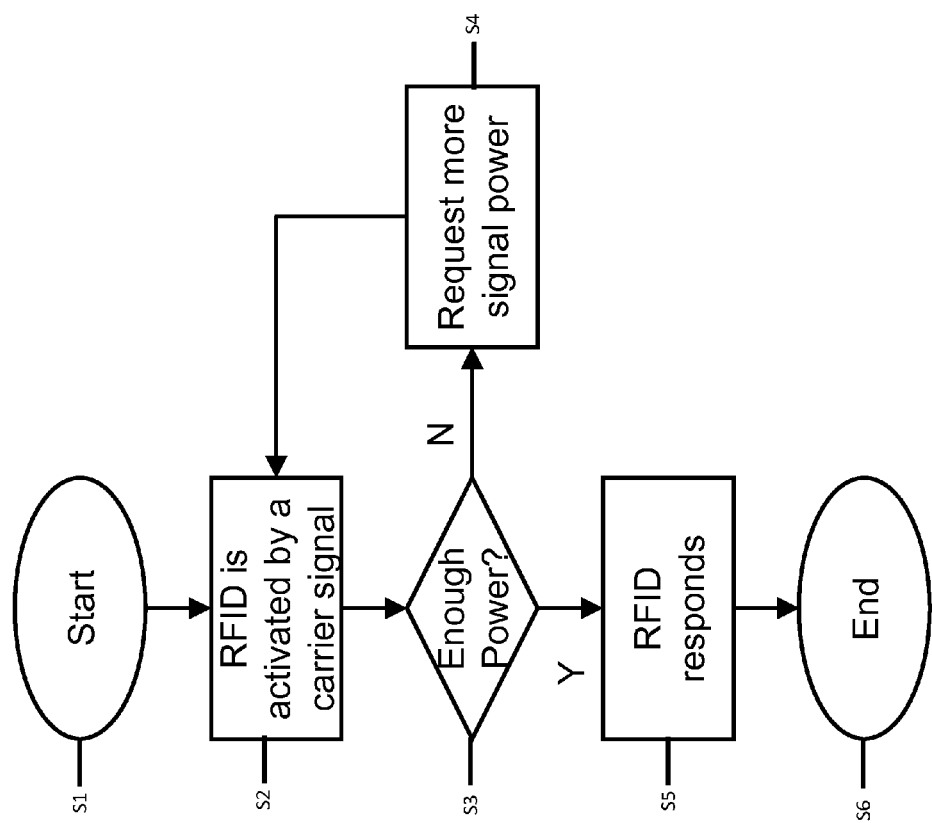
FIG. 3 depicts a method flow diagram according to the embodiment of FIG. 2.

Referring now to FIG. 2, an approach 18 for providing power to RFID transponder 30 is shown. Specifically, FIG. 2 depicts RFID reader 22 (with antenna 24) and RFID transponder 30 within range 36A of a magnetic signal/field 34 generated by power line 32. FIG. 2 also shows power control 20, which provides power through power line 32. This enables power line 32 to provide power to device/appliance 26 via hub 28. By drawing power from magnetic field 34 (e.g., 60 Hz), the range of the RFID transponder is increased from 36A to 36N as shown. In addition, interference can be reduced using a wideband noisy RF carrier. The manner in which such functionality is provided is shown in the method flow diagram of FIG. 3. Specifically, the process is started in step S1, The RFID transponder is activated by signal 34 in step S2. Then, in step S3, it is determined whether there is sufficient power. If not, additional signal power can be requested in step S3. Once there is sufficient power, the RFID transponder responds in step S5 and the process is completed in step S6.

Figure 4:
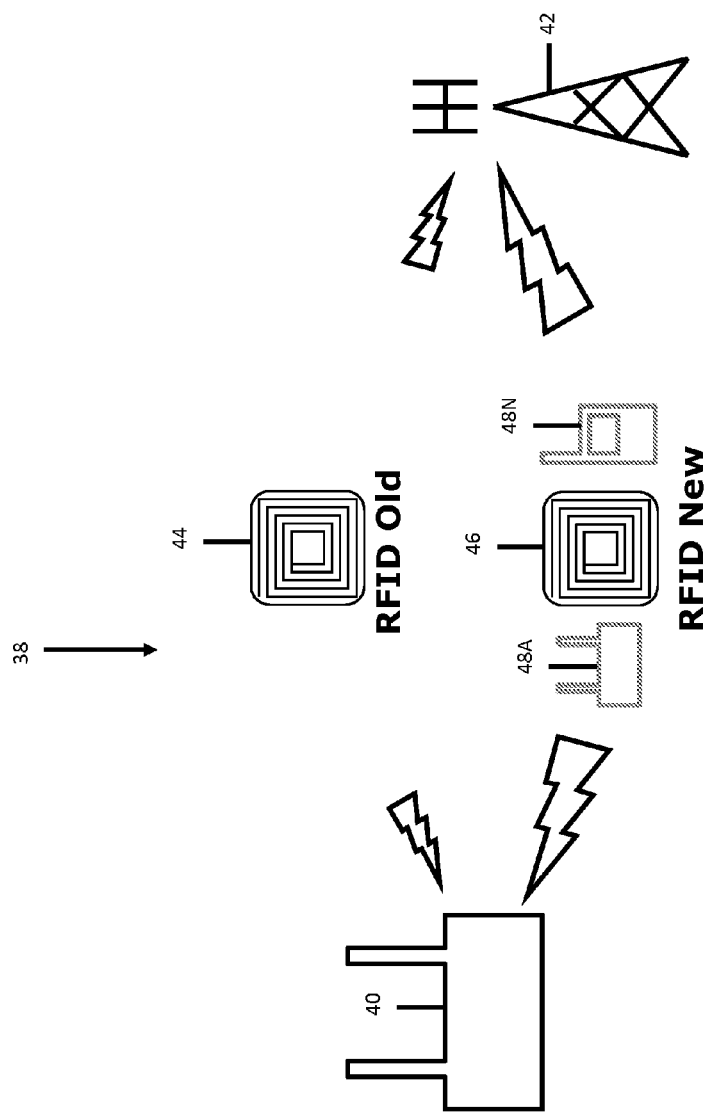
FIG. 4 depicts power delivery to RFID devices using a wireless network.

Referring now to FIG. 4, an alternate embodiment 38 is shown. As depicted, RFID transponder 46 is within range of a wireless network provided by wireless router 40 and antenna 42. Under this embodiment, RFID transponder 46 acts as a member of the wireless network and draws power from the field generated by the wireless network (as opposed to previous RFID transponders 44, which did not access the wireless network. In addition, RFID transponder 46 gains a set of user rights and controls on the wireless network. This enables RFID transponder 46 to gain a higher priority on the wireless network, and to request a higher level of power. Still yet, the user rights and controls enable RFID transponder 46 to control devices 48A-N that are accessible on the wireless network.

Figure 5:
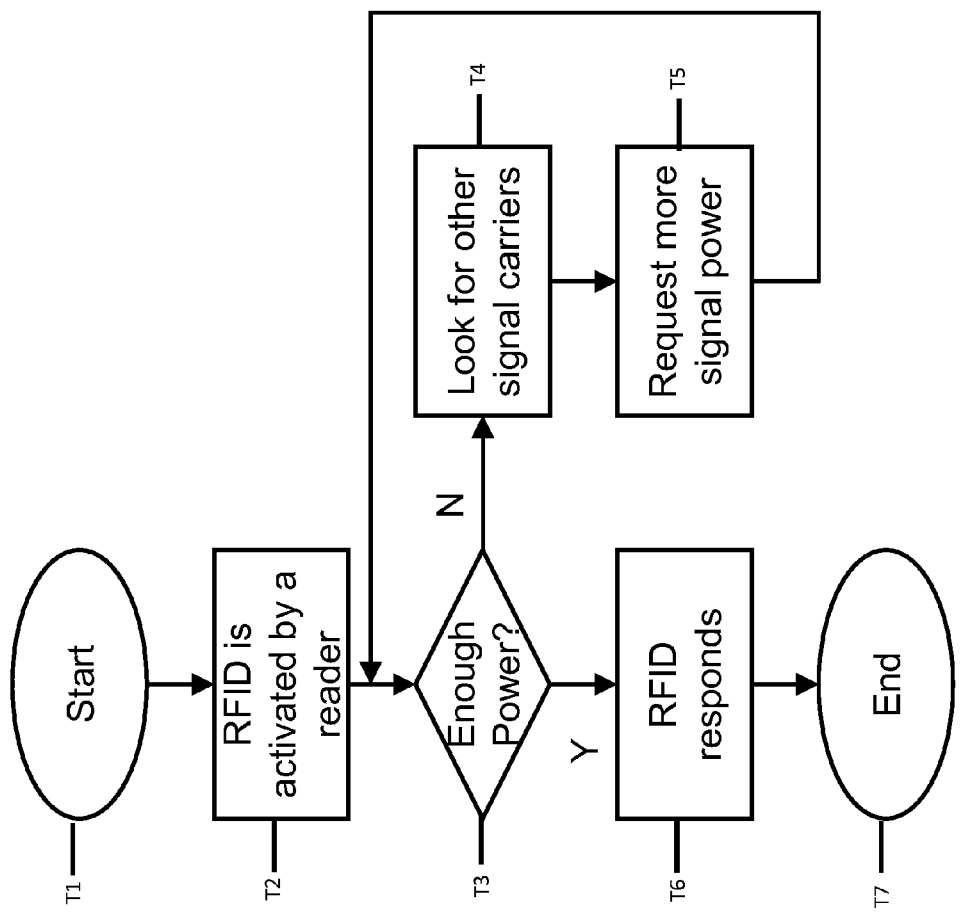
FIG. 5 depicts a method flow diagram according to the embodiment of FIG. 4.

Referring now to FIG. 5, a method flow diagram in accordance with embodiment 38 of FIG. 4 is shown. As depicted, the process is started in step T1 and the RFID transponder is activated by an RFID reader in step T2. In step T3, it is determined whether the RFID transponder has sufficient power. If not, the RFID transponder will look for other signal carriers in step T4 after which the RFID transponder will request more power in step T5. Once the RFID transponder has sufficient power, it will respond in step T6 and the process is ended in step T7.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for providing power to radio-frequency identification (RFID) devices through power lines and a wireless network, comprising:

placing a passive RFID transponder that does not include a power source within a field generated by a power line and the wireless network; and enabling the RFID transponder to communicate directly with an RFID reader that is outside of a normal operating range of the RFID transponder by powering the RFID transponder using the field generated by the power line and the wireless network;

the RFID transponder gaining a set of user rights and controls on the wireless network;

the RFID transponder gaining a higher priority on the wireless network using the set of user rights and controls;

the RFID transponder being configured to request a higher level of power:

from the power line; and from the wireless network using the set of user rights and controls.

2. The method of claim 1, the field further comprises a magnetic field.

3. The method of claim 1, further comprising reducing interference between the RFID transponder and the RFID reader using a wideband noisy RF carrier.

4. The method of claim 1, the field extending the normal operating range of the RFID transponder from the RFID reader.

5. The method of claim 1, the RFID transponder further comprising an RFID tag or an RFID label.

6. The method of claim 1, the field having a frequency of 60 Hz.

7. A method for providing power to radio-frequency identification (RFID) devices using a wireless network, comprising:

positioning a passive RFID transponder that does not include a power source in range of the wireless network;

the RFID transponder acting as a member of the wireless network; and the RFID transponder communicating directly with an RFID reader that is outside of a normal operating range of the RFID transponder by drawing power from a field generated by the wireless network;

the RFID transponder gaining a set of user rights and controls on the wireless network;

the RFID transponder gaining a higher priority on the wireless network using the set of user rights and controls;

the RFID transponder requesting a higher level of power using the set of user rights and controls.

8. The method of claim 7, further comprising controlling devices accessible from the wireless network with the RFID transponder using the set of user rights and controls.

9. The method of claim 7, the field further comprises a magnetic field.

10. The method of claim 7, the RFID transponder further comprises an RFID tag or an RFID label.

11. A method for active energy harvesting for radio-frequency identification (RFID) devices, comprising:

positioning a passive RFID transponder that does not include a power source in a field generated by a non-RFID power source; and communicating directly with an RFID reader that is outside of a normal operating range of the RFID transponder by providing power to the RFID transponder using the non-RFID power source;

the non-RFID power source being a wireless network;

the RFID transponder gaining a set of user rights and controls on the wireless network, and the RFID transponder gaining a higher priority on the wireless network using the set of user rights and controls;

the RFID transponder requesting a higher level of power using the set of user rights and controls.

12. The method of claim 11, the wireless network further comprises a cellular network.

* * * * *